(12) United States Patent
Yaddehige

(10) Patent No.: US 6,577,119 B1
(45) Date of Patent: Jun. 10, 2003

(54) PEDAL POSITION SENSOR WITH MAGNET MOVABLE RELATIVE TO A MAGNETIC FIELD SENSOR LOCATED IN A STATOR CHANNEL

(76) Inventor: Sena Yaddehige, Little Orchard Medbourne Lane, Liddington-Swindon (GB), SN4 0EY ( * ) Notice: Subject to any disclaimer, the term of this patent is extended or adjusted under 35 U.S.C. 154(b) by 0 days.

(21) Appl. No.: 09/699,242

(22) Filed: Oct. 27, 2000

Related U.S. Application Data

(63) Continuation-in-part of application No. 09/452,412, filed on Dec. 1, 1999, now abandoned.

(51) Int. Cl.⁷ .............................. G01B 7/30; G01D 5/14; G01R 33/07; G05G 1/28; F02D 11/02
(52) U.S. Cl. .............................. 324/207.2; 324/207.25; 324/251; 74/512
(58) Field of Search .................. 324/207.2, 207.21, 324/207.22, 207.24, 207.25, 251, 252; 74/512–514; 200/61.89, 84 C; 307/116; 338/32 R, 32 H; 335/205

(56) References Cited

U.S. PATENT DOCUMENTS

| | | | |
|---|---|---|---|
| 3,199,630 A | * 8/1965 | Engel et al. | 324/207.2 X |
| 3,668,596 A | * 6/1972 | Hubrich | 338/32 R |
| 5,528,139 A | 6/1996 | Oudet et al. | 324/207.2 |
| 5,694,039 A | * 12/1997 | Alfors | 324/207.2 |
| 5,789,917 A | 8/1998 | Oudet et al. | 324/207.2 |
| 5,861,745 A | 1/1999 | Herden | 324/207.2 |
| 6,018,241 A | * 1/2000 | White et al. | 324/207.2 |
| 6,137,288 A | * 10/2000 | Luetzow | 324/207.2 |
| 6,232,771 B1 | * 5/2001 | Herden et al. | 324/207.2 X |
| 6,307,365 B1 | * 10/2001 | Santos et al. | 324/207.2 X |

FOREIGN PATENT DOCUMENTS

| | | | |
|---|---|---|---|
| DE | 3916864 | 9/1993 | ............ 7/30 |
| DE | 4034991 | 10/1993 | |
| DE | 9407986 | 10/1994 | ............ 7/30 |
| DE | 9503335 | 12/1995 | ............ 26/2 |
| EP | 0514530 | 11/1992 | ............ 5/14 |
| EP | 0611951 | 8/1994 | ............ 5/14 |
| EP | WO 9848244 | 10/1998 | ............ 5/14 |
| EP | WO 9905475 | 2/1999 | ............ 5/14 |
| GB | 2288025 | 10/1995 | ............ 5/20 |
| GB | 2339915 | 2/2000 | ............ 7/30 |
| JP | 8241806 | 9/1996 | |

OTHER PUBLICATIONS

RD 393021 A—Inductive Contactless Position Sensor, 1997 , ,. . .
Gerhard Walliser, Electronik im Kraftfahrzeug, Expert Verlag, 1994,pp. 146–154,.
VDI Berichte 1152, Electronik im Kraftfahrzeug, 1994,pp. 320–339,,.

* cited by examiner

Primary Examiner—Gerard R. Strecker
(74) Attorney, Agent, or Firm—Bourque & Associates, P.A.

(57) ABSTRACT

A magnetic position sensor for sensing the position of a foot pedal in a motor vehicle and producing an electrical signal representative of the foot pedal position. The position sensor has a stator 7 with a channel 17 and a magnet 8 which can move along the surface 7a of the stator, the magnetic field in the stator channel 17 being dependent on the position of the magnet 8 relative to the stator 17. The magnet is connected to the foot pedal so that the movement of the foot pedal causes the magnet 8 to move along the stator surface and changes the magnetic field in the channel 17, the magnetic field in the channel 17 being sensed by a Hall probe 6 which produces an electrical signal proportional to the displacement of the magnet 8.

20 Claims, 8 Drawing Sheets

PEDAL POSITION SENSOR WITH MAGNET MOVABLE RELATIVE TO A MAGNETIC FIELD SENSOR LOCATED IN A STATOR CHANNEL

This is a continuation in part of pending U.S. Application Ser. No. 09/452,412 filing date Dec. 1, 1999 now abandoned. This invention relates to a position sensor, in particular for sensing the position of a foot pedal on a motor vehicle.

BACKGROUND

Conventionally, foot pedal controls such as the brake or accelerator pedal in a motor vehicle are connected to the corresponding vehicle component through a cable or other mechanical linkage. However, it may be desirable for a foot pedal to control the corresponding engine component such as the engine or brakes via an electrical signal. In order to achieve this, it is necessary to produce an electrical signal representative of the instantaneous position of the foot pedal.

Position sensors are known that use a potentiometer for detecting the position of a foot pedal. Such potentiometers rely on a sliding contact, and use of such a contact may result in wear and abrasion which could change the characteristics of the sensor over a period of time.

BRIEF SUMMARY OF THE INVENTION

According to one aspect of the invention, there is provided a position sensor for sensing the relative position of two components, the sensor comprising a stator connected to one component and having a surface which includes two magnetically separate regions of magnetic material separated by a channel; a magnetic unit connected to the other component and having north and south pole faces arranged relative to the surface so that when the magnetic unit is in a first position relative to the stator, at least a substantial part of one pole face lies over one of the regions of magnetic material and at least a substantial part of the other pole face lies over the other region of magnetic material, thereby producing a magnetic field across the channel, and when the magnetic unit is in a second position the north and south pole faces of the magnetic unit lie over the same region of magnetic material such that no magnetic field is produced across the channel; and a magnetic field sensor placed in the channel so as to produce a signal which is dependent on the magnetic field in the channel and which represents the relative position of the two components.

Because the position sensor does not rely on a sliding electrical contact, electrical problems due to wear and abrasion within the sensor will be alleviated and the reliability of the sensor can be improved.

When the sensor is used to sense the position of a pedal in a motor vehicle, the stator may be fixed to the vehicle body (the one component) and the magnetic unit may be fixed to the pedal (the other component). Movement of the foot pedal then causes the magnetic unit to move relative to the stator, and the position of the foot pedal can be determined from the sensed position of the magnetic unit.

The signal produced by the magnetic field sensor could be passed to the engine control of the vehicle for example, thus replacing the conventional mechanical connection between the engine and the accelerator pedal.

In most applications the stator is held stationary whilst the magnetic unit is moved, but it is also possible for what is here termed the stator to be moved whilst the magnetic unit is held stationary.

The magnetic unit may be made entirely of a permanent magnet material, but preferably the magnetic unit comprises a permanent magnet fixedly attached to a section of magnetic material with at least one pole face of the magnetic unit being formed by the magnetic material. The section of magnetic material may be made from mild steel so that it can easily be machined into the desired shape.

To allow the stator to be mounted on an electronic circuit board, the regions of magnetic material may be held in their correct positions by being attached to a non magnetic base.

The stator surface and the pole faces are preferably flat, the pole faces being able to move in a plane that is adjacent to the surface of the stator, the separation between the stator surface and the pole surfaces being small to ensure a good magnetic coupling between the magnetic unit and the stator.

To allow free movement of the pole faces relative to the stator surface, a layer of plastics material such as Teflon may be placed between the stator surface and the pole faces.

The magnetic unit is preferably arranged so that as it moves from the first position to the second position, one pole face remains over a single region of magnetic material whereas at least part of the other pole face crosses from one region of magnetic material to the other region. This arrangement is useful because when one pole face lies above two separate regions of magnetic material, continuous displacement of that pole face results in a continuous change in the relative coupling to each magnetic region, and hence a continuous change in the magnetic field within the channel.

Although the channel may be a single straight line, the channel preferably comprises a subsidiary channel section and a main channel section at an angle to one another, the magnetic unit being arranged such that movement of the magnetic unit is in a direction parallel to the subsidiary channel. This conveniently allows both poles of the magnetic unit to be moved together along the direction followed by the subsidiary channel such that only one of the poles crosses the main channel, the other pole remaining over the same region of magnetic material.

To help ensure the position sensor provides a linear position signal, the incremental area of a pole face crossing the main channel per unit displacement of the magnetic unit may be constant throughout the sensed traveling distance of the magnetic unit. To help further ensure the linearity of the position sensor, the leading and trailing edges of the pole face crossing the main channel may be parallel to the main channel as they cross the main channel.

The magnetic field sensor may reside in either the subsidiary channel section or the main channel section, but preferably the magnetic field sensor will reside in the main section, orientated to measure the magnetic field component perpendicular to the length of the main channel section.

In a preferred embodiment, the subsidiary channel section and the main channel section form a right angle where they meet, the channel and the magnetic unit being arranged so that when the magnetic unit is in the first position, each pole face resides on a different side of the subsidiary channel, thus producing a magnetic field that is substantially perpendicular to the subsidiary channel.

With the magnetic field sensor placed in the main channel, this arrangement allows for a measurement of the magnetic field component due to the magnetisation of the stator whilst reducing the contribution from the magnetic field component produced directly by the magnetic unit, thereby alleviating the proximity effects of the magnetic unit as it passes over the channel and further improving the linearity of the position sensor.

To further reduces the proximity effects of the magnetic unit, the main channel may have a small width in comparison to its depth.

The subsidiary channel may be straight, but in a preferred embodiment the subsidiary channel is arcuate and the magnetic unit is connected to an arm pivoted at 90 degrees to the stator surface, so that movement of the arm causes the magnetic unit to move over the stator surface along the subsidiary channel.

The arm may be pivoted in common with a foot pedal such that angular displacement of the foot pedal causes an identical angular displacement of the magnetic unit relative to the stator, thereby allowing the position of the foot pedal to be determined from the position of the magnetic unit.

To facilitate fabrication, the arm may be made of magnetic material and formed integrally with the magnetic unit.

The magnetic field sensor may conveniently comprise at least one Hall probe, preferably producing a Hall voltage proportional to the sensed magnetic field. Since a Hall probe can be formed from a thin layer of electrically conducting material which senses the magnetic field perpendicular to the layer, the Hall probe may conveniently be placed within a narrow channel to measure the field across the width of the channel.

In a simple embodiment, the channel has parallel vertical side walls formed by the regions of magnetic materials, the floor of the channel being formed by the non magnetic base.

However, in another embodiment, at least the main channel section when viewed in cross section may have a recess parallel to the stator surface, the recess being formed by an area of overlap between the two regions of magnetic material. Such an arrangement allows a Hall probe to lie parallel to the stator surface when mounted in the channel, thereby facilitating the incorporation of the position sensor into a circuit formed on a circuit board.

The invention also extends to a foot pedal assembly for use in a motor vehicle, the assembly comprising a pedal base to be fixedly mounted in a motor vehicle, a pedal pivotably mounted on the base, and a position sensor as claimed in any preceding claim arranged to sense the angular position of the pedal relative to the pedal base.

According to another aspect of the invention, there is provided a magnetic field sensor comprising a first and a second electronic chip, each chip having a flux sensitive area for sensing magnetic field and an integrated circuit integrally formed therewith such that each chip produces an electrical output signal representative of the magnetic field sensed by each respective flux sensitive area, wherein the first and second chips are mounted adjacent to one another in a single package such that the separation between the flux sensitive area of each chip is 1 mm or less.

The two signals produced by each chip can be compared with one another to ensure that the sensor is working correctly. Because the two flux sensitive regions are close together, any spacial non uniformity in the magnetic field will produce only a small difference between the output signal of each chip.

The separation between the flux sensitive regions will be understood to be the separation between the closest points of these regions.

The two chips may be integrated onto a single piece of semiconductor material, in which case the separation between the two flux sensitive regions will preferably be less than 500 microns.

DESCRIPTION OF THE DRAWINGS

The invention will now be further described, by way of example, with reference to the accompanying drawings, in which.

DETAILED DESCRIPTION

In the position sensor of FIGS. 1 to 4, the position of a magnetic unit 8 relative to a stator 7 is sensed by measuring the change in the magnetic field in a channel 17 when the magnetic unit 8 is displaced. The magnetic unit 8 can be moved relative to the stator 7, from a first position shown in FIG. 1, though an intermediate position shown in FIG. 2, and to a second position shown in FIG. 3.

Figure 4:
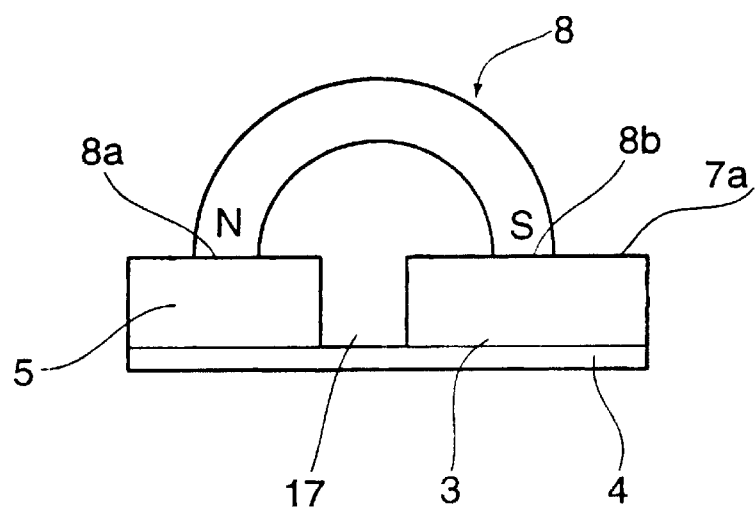
FIG. 4 is a sectional view of the position sensor in FIG. 1 along the line IV—IV.

In FIG. 4 the stator is shown in cross section having two regions of magnetic material 3 and 5 separated magnetically by a channel 17 but held fixed relative to one another by a base member 4 made from a non magnetic material. The magnetic unit 8 is shown having the shape of an arch, with the pole faces 8a and 8b resting against the stator surface 7a. However, the magnetic unit need not be an arch and the pole faces need not be in contact with the stator surface 7a.

Figure 1:
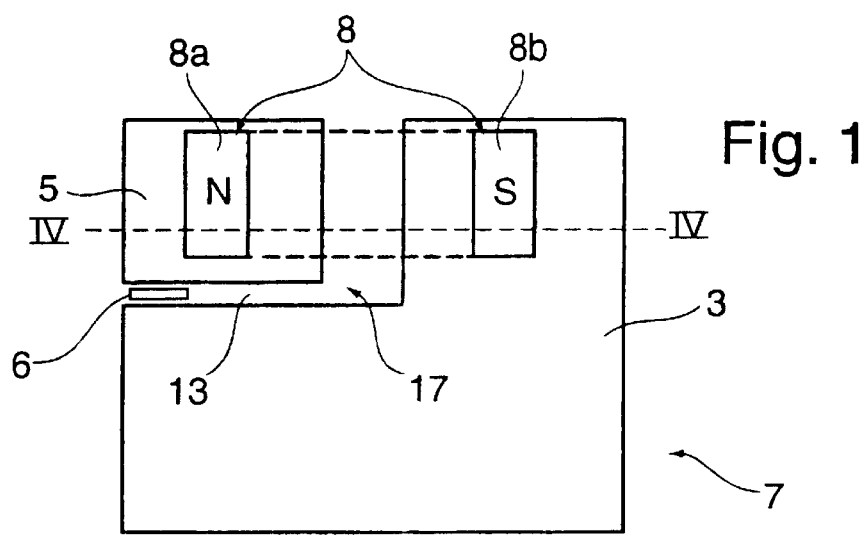
FIGS. 1, 2 and 3 are plan views of a position sensor in accordance with the invention, showing the magnetic unit in three different positions.

When the magnetic unit is in the first position as shown in FIG. 1, each pole face lies over a different region of magnetic material to the other pole face. Because the pole faces 8a and 8b are closely coupled magnetically to the separate regions of magnetic material 5 and 3 respectively, these regions become magnetised and effectively behave as an extension of the pole faces 8a and 8b, resulting in a magnetic field in the channel 17 of which the main channel section 13 forms part.

Figure 3:
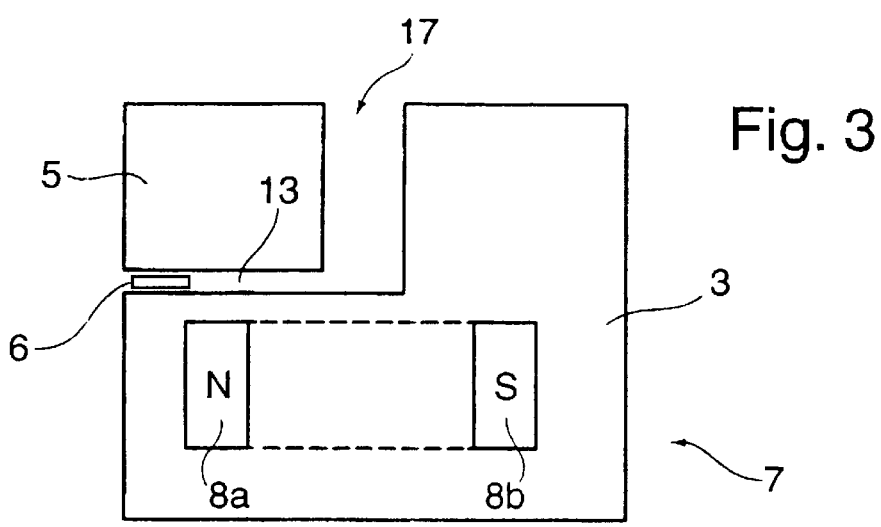

However, when the magnetic unit is in the second position as shown in FIG. 3, the pole faces overlap the same region of magnetic material 3. The magnetic material 3 becomes magnetised and acts as a guide for the magnetic field between the pole faces 8a and 8b, bypassing the channel 17. Since the north pole face 8a is no longer coupled to the region of magnetic material 5, this region is no longer significantly magnetised, and there is only a very small magnetic field in the channel 17.

Figure 2:
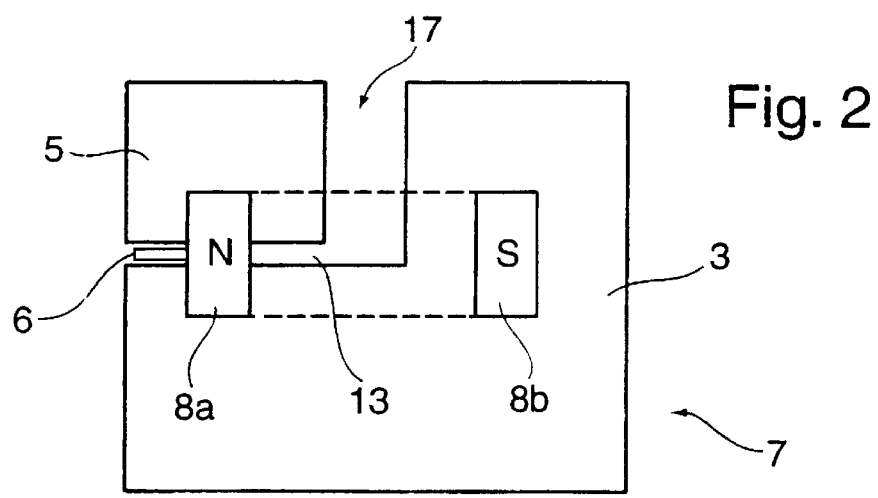

In the intermediate position shown in FIG. 2, the north pole face 8a only partly overlaps magnetic region 5, so the coupling between the north pole face and the magnetic region 5 is only partial. Some of the magnetic flux flows directly via the magnetic region 3 joining the north and south poles, and only some flux flows via magnetic region 5 and across the channel 17. The magnetic flux flowing across the channel 17 depends on the degree of coupling between the north pole face and the region of magnetic material 5, which in turn depends on the degree of overlap with the north pole face and hence the position of the magnetic unit.

Displacement of the magnetic unit will only result in an appreciable change in the sensed magnetic field if there is a change in the coupling between the magnetic unit 8 and the regions of magnetic material 3, 5. Since the coupling is dependent on the overlap area of the pole faces with the regions of magnetic material, displacement of the magnetic unit 8 from the position shown in FIG. 1 or 3 will not be sensed until the pole face 8a reaches an edge of the main channel section 13, which is also referred to as an air gap 13.

When viewed from above, the channel is substantially L-shaped. The magnetic field sensor 6, which here consists of a Hall probe, resides in the channel section 13 that is substantially parallel to the magnetic field generated along the north-south direction between the poles of the magnetic unit.

The positioning of the Hall probe 6 within the channel section 13 helps to ensure that it only measures the magnetic field due to the magnetisation of the magnetic regions 3 and 5. This is important because when the magnetic unit lies above the channel section 13 as is the case in FIG. 2, the resulting proximity effect could otherwise reduce the linearity of the position sensor.

Figure 5:
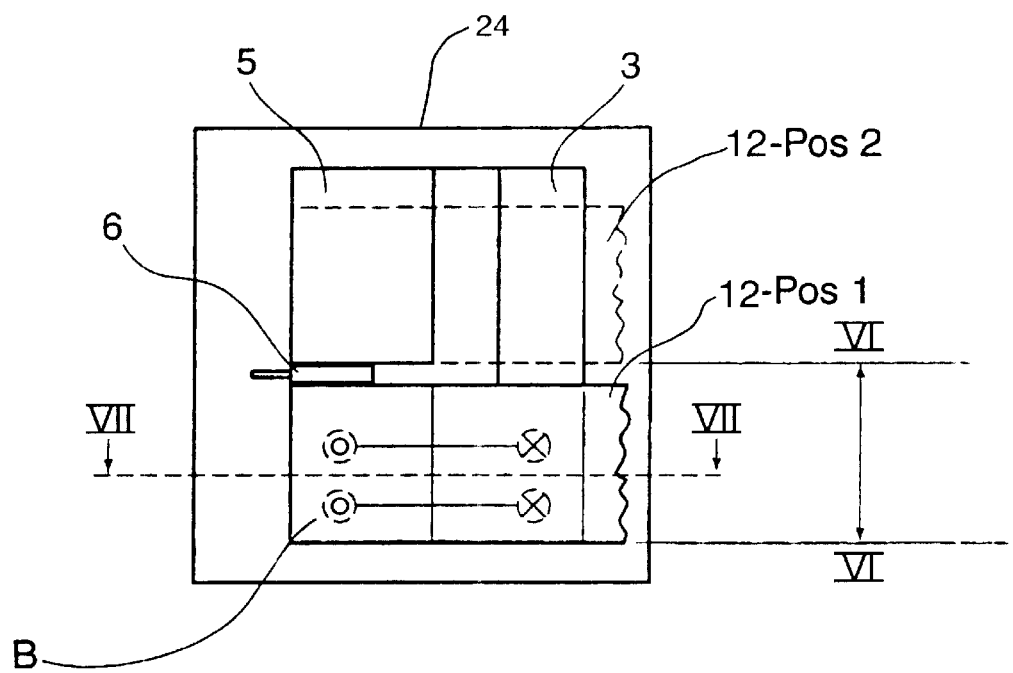
FIG. 5 is a top view of one embodiment of a position sensing apparatus in accordance with the invention.
Figure 6:
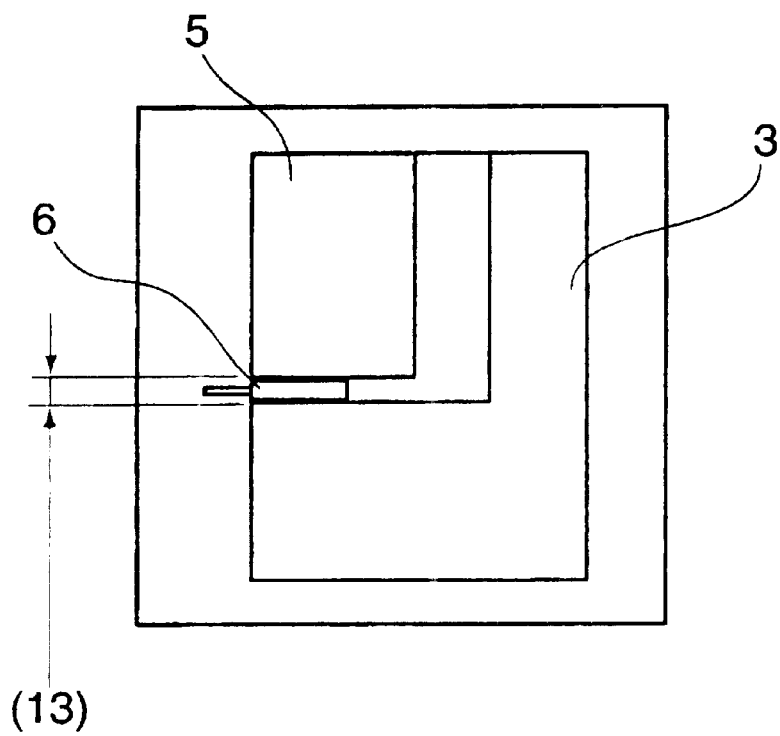
FIG. 6 is a sectional view of the apparatus of FIG. 5 taken along the line VI—VI.
Figure 7:
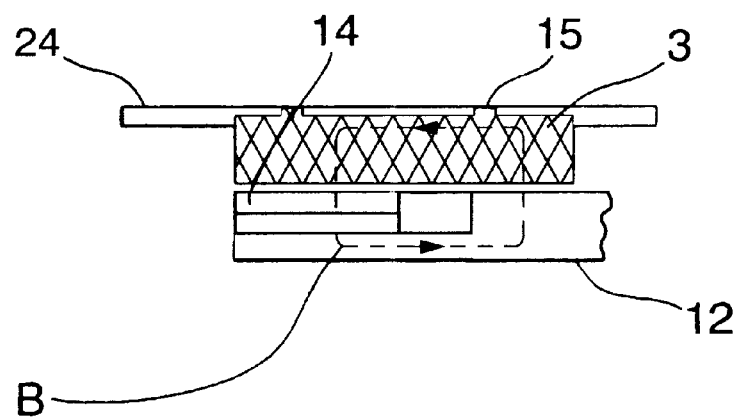
FIG. 7 is a sectional view of the apparatus of FIG. 5 taken along the line VII—VII.

FIGS. 5, 6 and 7 are illustrating an exemplary position sensing apparatus which magnetically senses the position of a moving organ 1. (In FIG. 5, the moving organ 12 is shown in two positions: 12 Pos 1 designates the moving organ 12 in position 1, and 12 Pos 2 designates the moving organ 12 in position 2.

The exemplary moving organ consists of a magnet 14 having a North and a South pole, firmly linked to a magnetic coupling device 12 which also is the mechanical linkage to the sensing movement part, i.e., the linkage to the foot-pedal shaft. The total embodiment consists of the moving organ 1; two flux conducting stator pieces 3, 5; the Hall probe 6 which is assembled in the air gap 13 and the printed circuit board 24.

FIG. 5 shows the Zero position (Pos.1) of the moving organ with the magnetic field lines B which are also shown in FIG. 7 in a sectional view. The magnetic field lines B are going from magnetic North pole through the coupling device of the moving organ 12 through the stator piece 3 back to the South pole of the magnet. At the Zero position (Pos.1) the magnetic field lines B are closed in a way that there is no flux in the air gap 13 which means that the output of the Hall probe, which is a linear flux density measuring unit, is Zero. The assembly is designed in a way that the air gap between the moving organ and the stator pieces 3 and 5 is very small. To have a very constant distance between the moving organ and the stator pieces there is an option to use a thin ptfe foil to allow mechanical contact between the stator pieces. A very small and constant magnetic gap is achieved between the moving organ and stator pieces by pressing the moving organ slightly against the ptfe foil. Although, the standard embodiment will have a small air gap between the stationary and the moving parts. The permanent magnet 14 is made out of rare-earth material such as neodymium-iron-boron (NdFeB) which gives an excellent flux density and a very low temperature coefficient. The magnetic data of the used material for the permanent magnet are:

| | |
|---|---|
| Energy density | 35 MGOe |
| Coercivity | 12.5 kOe |
| Remanence | 1.2 T |
| Permeability | 1.07 mT/kA/m |
| Temperature coefficient | −0.1% /K |

The very low temperature coefficient and the high magnetic remanence give good performance and stability over a long service life and over a wide range of temperatures for the magnetic circuit. Because of the high flux intensity which the magnet creates the sensor is very robust against any EMC or magnetic field interference.

The carrier of the magnet 11 and the stator pieces 3, 5 are made out of soft magnetic sintered material which gives excellent magnetic conductance combined with high production precision at very low costs.

Figure 14A:
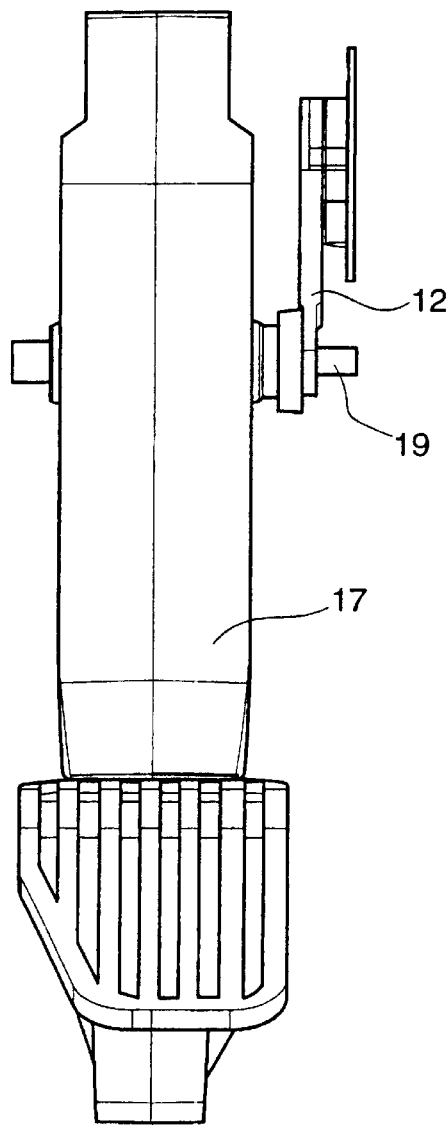
FIG. 14A is a top view of one embodiment of a position sensing apparatus in accordance with the invention which shows an application for an accelerator- and/or a brake pedal module with integrated position sensing apparatus and FIG. 14B is a closeup of the sensor shown in FIG. 14A.
Figure 14B:
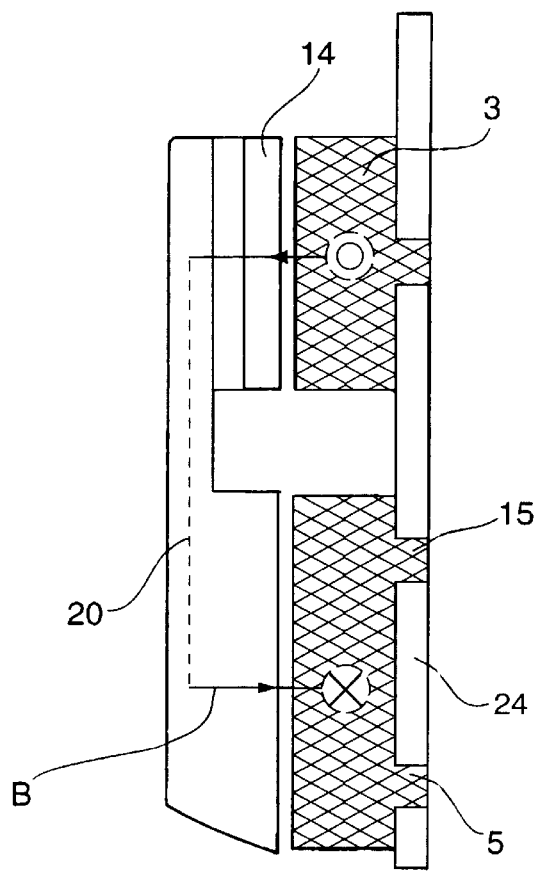

The moving organ 14 can be linked to the shaft of a foot-pedal 19 using hole 18 (shown in FIG. 8) with an interference fit as shown in FIG. 14. The stator pieces are located in the circuit board with two pins 15 which are parts of the sintered stator pieces and fit to holes in the circuit board. For getting a firm fit of the stator pieces they are bonded to the circuit board with technical adhesive such as epoxy.

The Hall probe 6 is fitted in the air gap. The measurement direction is perpendicular to the air gap. The probe is also fixed with adhesive and electrically connected with the printed circuit board 24 by soldering the leads of the probe to the printed circuit board 24.

FIG. 5 is also shows the Full Travel Position of the moving organ 14 (Pos. 2). In this position the magnetic field lines B are coming from the North Pole through the carrier of the moving organ 12 to the upper part of the stator piece 3 through the air gap and the Hall probe in the stator piece 5 and back in the South Pole of the magnet 14. In this position the magnetic field lines which were produced from the magnet 14 are going through the Hall probe which will get maximum output in this position as shown in FIG. 7 (Pos. 2). The flux density and the output of the Hall probe which are directly linked will increase linearly from Pos. 1 where the flux density in the Hall probe is Zero to maximum output at Pos. 2 where the flux density is a maximum.

Figure 8:
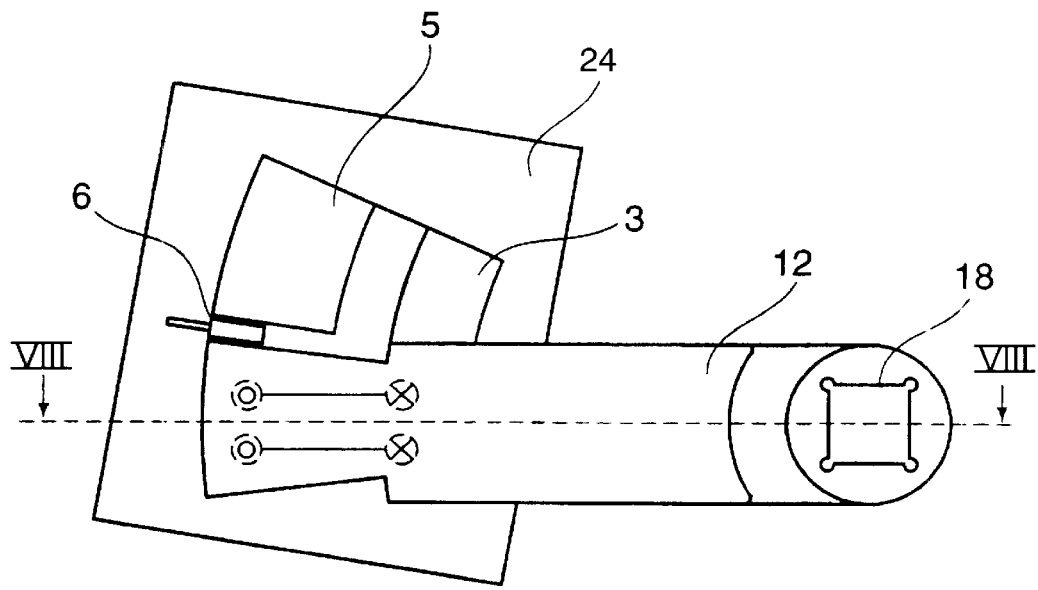
FIG. 8 is a top view of an embodiment of a position sensing apparatus in accordance with the invention. This shows the starting position of the position measurement with a moving organ that is integrated in a lever which can be linked with the shaft of an accelerator or a brake pedal.
Figure 9:
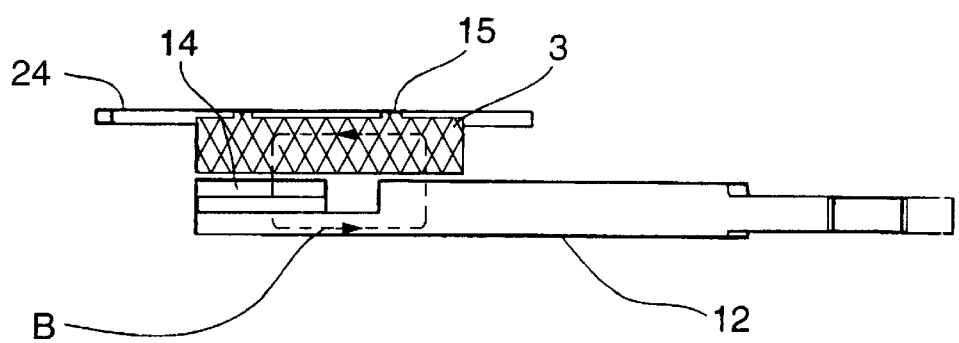
FIG. 9 is a sectional view of FIG. 8 taken along the line VIII—VIII and is showing the magnetic field lines at the Zero position (Pos.-1) of the working travel.

FIG. 8 is a top view of a preferred embodiment for application as foot-pedal sensor consisting of the same major parts as shown in FIG. 5: moving organ 12; stator pieces 5, 3; Hall probe 6 assembled in air gap 13 and circuit board 4. FIG. 9 shows the Zero position, with magnetic field lines B having no flux in the air gap and the Hall probe. The moving organ consists of a rare-earth magnet firmly linked to the carrier part for example with epoxy, and the carrier part itself which is also the flux conductor and the linkage to the pedal shaft. For that reason the carrier is made out of magnetic mild steel sinter material such as Fe+2%Si+ 0.45%P and has rectangular hole 18 suited for an interference fit with the shaft (axis) of a foot pedal 19.

FIG. 9 shows a side view of the embodiment described above and shown in FIG. 8. As the moving organ 14 is in the Zero position, there is no magnetic flux (B) in the air gap and the Hall probe.

Figure 10:
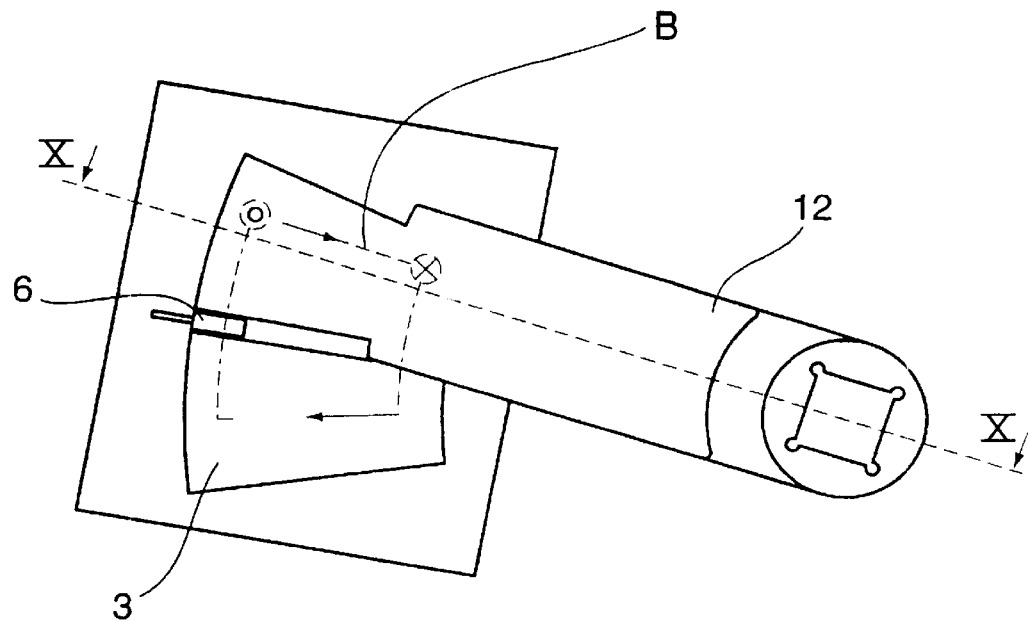
FIG. 10 is a top view of the apparatus of FIG. 8 showing the magnetic field lines in the Full Travel position (Pos.-2)

FIG. 10 shows the same apparatus in the Full travel position (Pos. 2). The course of the magnetic field lines shown, form very clearly the function in accordance with the invention. This means that in the Full Travel position (Pos. 2), the flux intensity and the output of the Hall probe will raise linearly with the movement of the moving organ. As the moving organ is directly linked to the shaft of the foot-pedal the output of the Hall probe will continuously raise with the movement of the foot-pedal.

Figure 11:
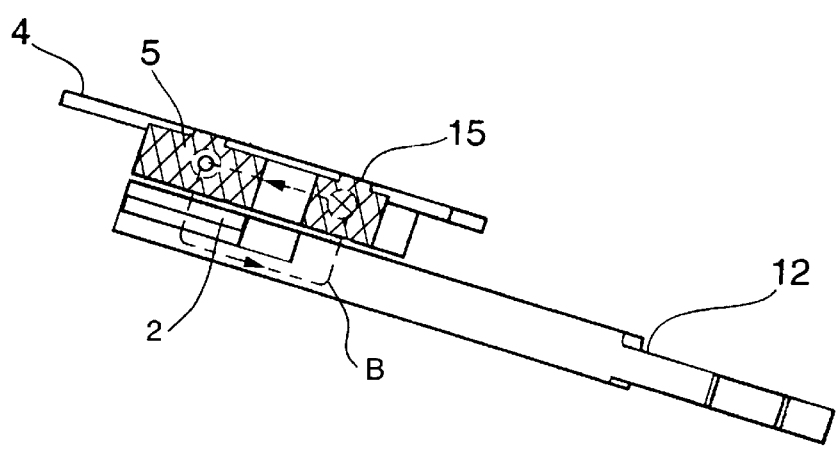
FIG. 11 is a sectional view of FIG. 10 taken along the line X—X and is showing magnetic field lines at Full Travel position (Pos.-2)

FIG. 11 shows a side view of the embodiment described above and shown in FIG. 10. As the moving organ 14 is in the Full Travel position, the magnetic flux (B) passes through the air gap and the Hall probe.

Figure 12:
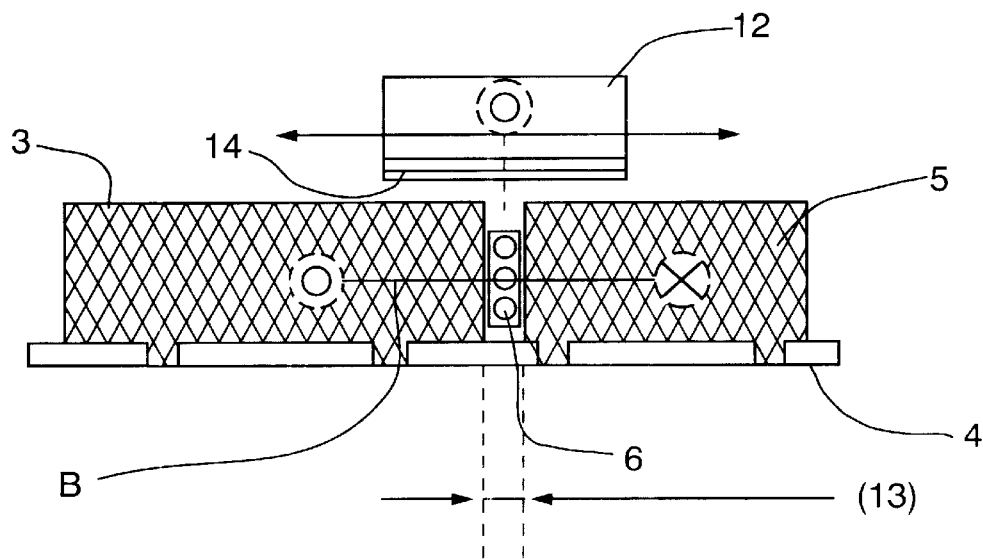
FIG. 12 is a sectional view of one embodiment of a position sensing apparatus in accordance with the invention which shows an air gap which is perpendicular to the direction of the moving organ. This means the magnetic flux through the sensor runs parallel to the motion of the moving organ.

FIG. 12 shows a preferred embodiment in accordance with the invention in a sectional view through the magnetic pole and the Hall probe. It can be seen that the magnetic field lines B through the Hall probe 6 are parallel or tangential to the motion of the moving organ 12 and perpendicular to a North-South line of the permanent magnet 14.

Figure 13:
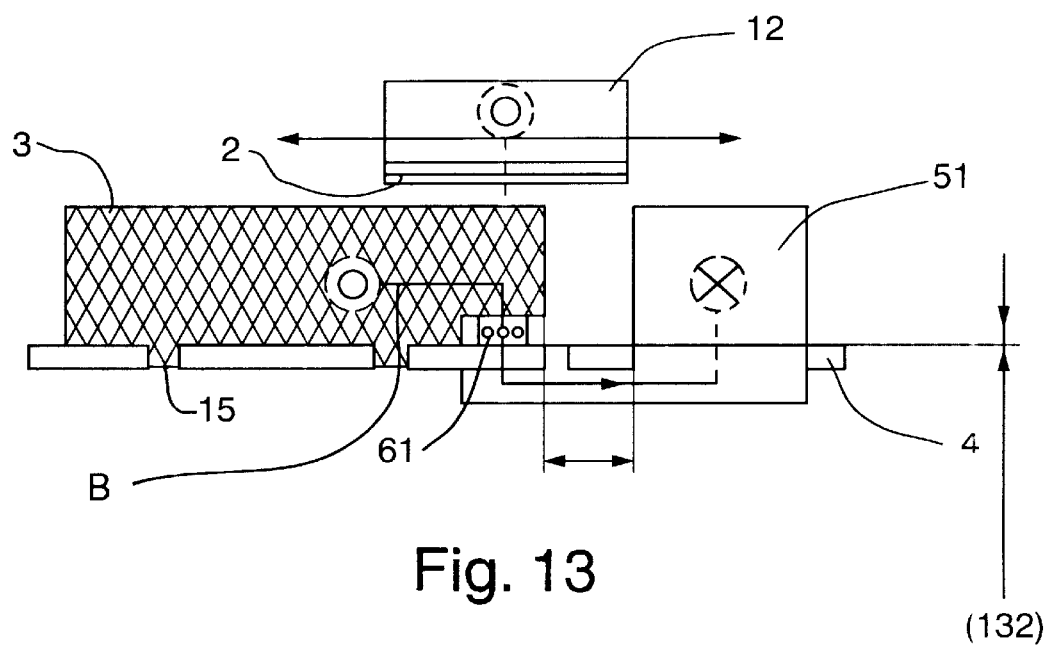
FIG. 13 is a sectional view of one embodiment of a position sensing apparatus in accordance with the invention which shows an air gap which is parallel to the direction of the moving organ. This means that the magnetic flux through the sensor runs perpendicular to the motion of the moving organ.

For some applications it can be more suitable to have the Hall probe flat on the printed circuit board 24, because the Hall probe 61 (FIG. 13) will be integrated in a standard SMD-device housing ASIC (Application Specific Integrated Circuit). The measurement direction of a CMOS Hall sensing element is always perpendicular to the silicon chip placed because of the internal bonding contacts lying parallel to the contacting leads of the SMD element. As the magnetic field lines B are going perpendicular through the printed circuit board 24, the ASIC integrated Hall probe can be positioned flat on the printed circuit board 24, which means that the Hall probe ASIC can be assembled automatically with standard SMD-assembly machines and soldered with standard soldering processes. This gives major advantages to a simplified sensor design which needs no special holders for the Hall probes to integrate them in slots of the magnetic circuits. To give the same functionality as shown in FIG. 12 the design of the magnetic material 3, 5 has to be changed according to FIG. 13. The magnetic material 31 has an L-shaped recess in which the Hall probe 61 can be assembled. The magnetic material 51 also has an L-shape, for conducting the magnetic field lines perpendicular through the Hall probe giving the same output characteristic, in dependence on the position of the moving organ, as shown in FIG. 12.

FIG. 14 shows a preferred embodiment integrated in a foot-pedal assembly. This figure shows the linkage between the moving organ 12 and the pedal shaft 19. It is easy to assemble the stationary parts of the sensor, ie the circuit board 4, the magnetic poles 3, 5 and the Hall probe 6,61 in a plastic housing with the integrated device connectors which can be fixed on the foot-pedal bases with screws or by a snap fit. The moving organ is linked to the pedal shaft 19 via a rectangular hole in the carrier of the moving organ 14 via interference fit.

The printed circuit board 24 is needed to connect the Hall probe with the device connector which will connect the Hall probe with the CPU of the electronic drive-by-wire or brake-by-wire systems. The Hall probe is not only a Hall sensing element but has a low temperature drift due to chopper compensation of magnetic and offset drift integrated. Thus the probe will be recognised as a state-of-the-art ASIC with temperature compensation, a signal fitting unit, a programming unit and an output signal.

The temperature chopper compensation for magnetic and electric offset drift will give a very low temperature coefficient of the device so that in addition with a permanent magnet out of NdFeB the whole position sensing apparatus will have a low temperature coefficient which will give very accurate function over the whole temperature range in an automotive passenger compartment without any further expensive and complicated temperature compensation.

Figure 16:
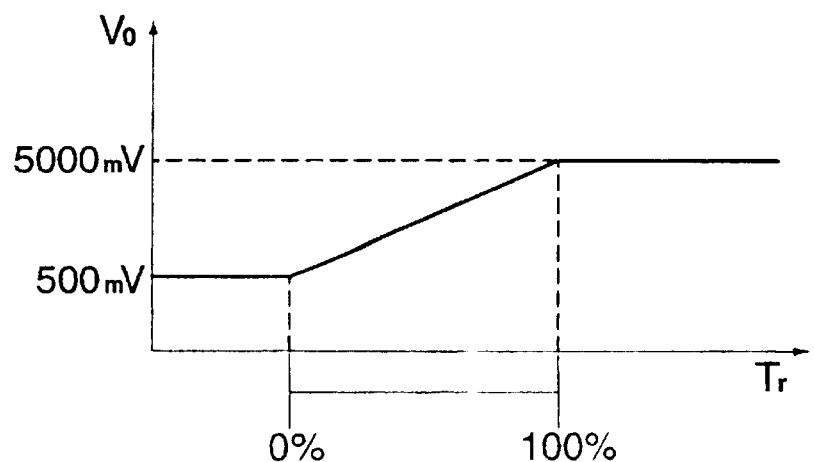

The signal fitting unit will generate an output voltage which is ratio-metric to the supply voltage of the Hall probe and will deliver a big signal output with low impedance between i.e., 500 mV for the Zero position and 4500 mV for the Full travel position with 5000 mV supply voltage (see FIG. 16). Such output voltages with low impedances like i.e., 1000 Ohms will be very stable against any EMC-Interference and voltage drops caused by the wiring and the connectors of the car.

The programming unit will allow programming of the offset and the gain values at an end-of-line programming of the whole assembly. This means that all tolerances which are mechanical and magnetic, and all the tolerances of the linkage between the position sensing apparatus and the foot-pedal mechanism can be compensated electronically through a very easy end-of line-programming of an integrated EEPROM, which will be integrated in the intelligent Hall probe ASIC. After programming the program mode is locked, so that there can be no changes during the lifetime of the device.

The output unit will generate a low impedance signal and realise a short circuit and a pulse protection of the device.

Nowadays brake-by-wire and drive-by-wire systems have extreme demands according to the interlinearity of the two redundant output signals. Because of the nature of the safety critical application, modern drive-by-wire and brake-by-wire system need two redundant output signals. For that reason the Hall probe ASIC is designed to have two complete functional, programmable electronic circuits as described above, in one housing to be able to deliver two redundant output signals. Because the values of gain and offset are programmable this device can deliver different put signals:

1. Two equal output signal
   S1 (Pos. 1 to Pos. 2): 0.5V–4.5V
   S2 (Pos. 1 to Pos. 2): 0.5V–4.5V
2. Two crossed outputs
   S2 (Pos. 1 to Pos. 2): 4.5V–0.5V
   S1 (Pos. 1 to Pos. 2): 0.5V–4.5V 3. Two equal outputs with different slope
   S1 (Pos. 1 to Pos. 2): 0.5V–4.5V
   S2 (Pos. 1 to Pos. 2): 0.25V–2.25V To achieve the desired redundancy, there can be either two Hall probes placed close together in the channel, or one probe feeding two parallel electronic circuits. The two electronic circuits outputs are continuously monitored to check that both are correct, and then one or other of them is used as the sensor output. Known redundancy strategies can be used to ensure that, in the event of a discrepancy between the two signals, the correct one is chosen as the sensor output.

Figure 15:
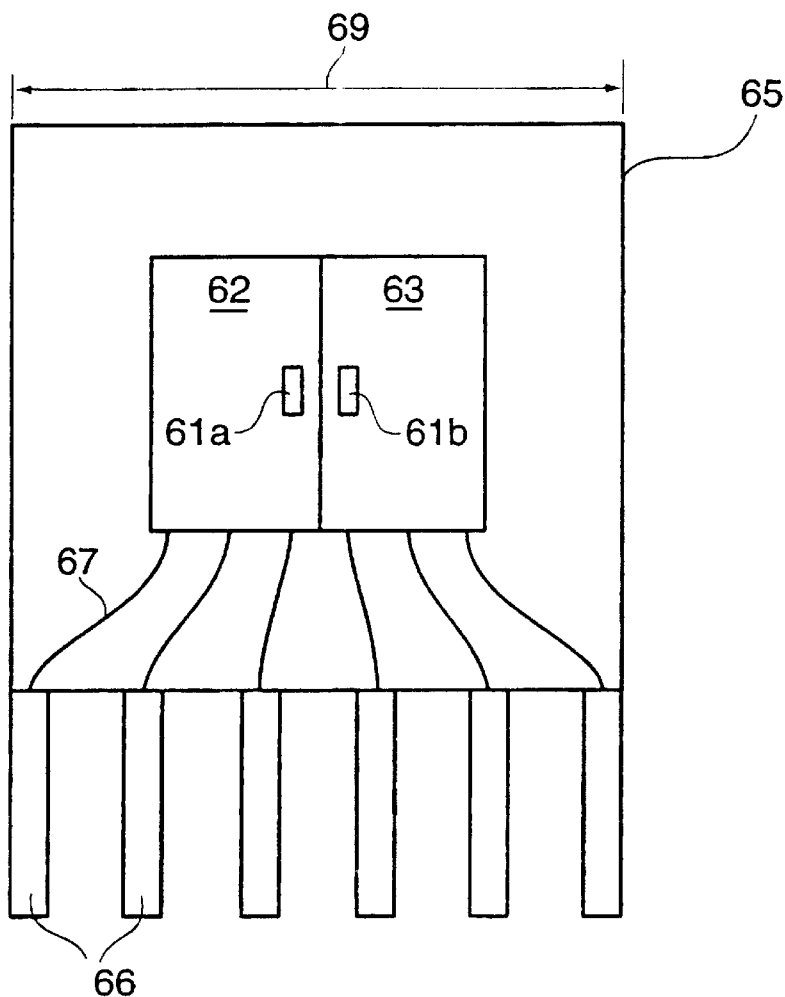
FIG. 15 is a schematic planar view of a dual Hall probe device for use with the position sensing apparatus; and, FIG. 16 is a graph showing the output voltage of a signal fitting unit as a function of travel position.

However, in a preferred embodiment two ASICs will be used, each of which will have a flux sensitive area or Hall probe integrally formed with an electronic circuit and each of which will produce a signal which can be used as part of a redundant signal strategy. In the embodiment shown in FIG. 15, a first ASIC chip 62 and a second ASIC chip 63 are mounted together side by side in a single package 65. The Hall probe 61a of the first ASIC 62 and the Hall probe 61b of the second ASIC 63 are separated by a distance of about 1 mm or less, in order to reduce any error if the magnetic field is non uniform. Each ASIC chip will be electrically connected by wires 67 to a plurality of connecting fingers 66 which can be soldered or otherwise joined to an electronic circuit.

The width of the package 65 in the direction of the arrow 69 is typically about 6 mm, and each ASIC chip is about 2 mm wide. Because of its small size the package 65 can easily be placed in the channel 17.

The ASIC chips 62 and 65 are of a planar structure, and will be formed from one or more patterned layers of semiconductor material. The chips 62 and 65 will typically have a thickness of about 1 mm.

Where there are two ASICs, they can be of small size and can be mounted close together so that there will be none, or only minimal interlinearity errors between the signals, and the same accuracy can be obtained as with one ASIC. The use of two ASIC's in this way allows the packaging to be no different from packaging a single ASIC unit.

For extreme demands for short circuit protection and pulse stability against incoming pulses, the output of the sensor may have the requirement for further electronic components because the energy dissipation of the ASIC is limited due to the small size of the crystal. Such components can be easily assembled with standard procedures as SMD devices on the printed circuit board 24. This means that a position and speed sensor can be adapted to different applications without any mechanical or system changes.

Today's state-of-the-art application have analogue output signals, but future applications will have intelligent serial digital output signals such as CAN buses. Bus interfaces can be integrated in the circuit board or be integrated in the Hall probe.

The combination of a sensor in accordance with this invention with an intelligent Hall probe with integrated temperature compensation; signal conditioning and programmable signal fitting in combination with the very simple and flat mechanics of the magnetic circuit makes the sensor extremely suitable for applications in foot-pedals. Because of its programmable signal fitting for example for the offset and the gain values, the sensor can be adapted to different foot-pedal mechanics by end of line programming i.e., different pedal travels can be accommodated without any mechanical changes to the sensor. This means that the sensor in accordance to this invention can be produced as a standard part, in high volumes.

The sensor can thus be produced fully automatically as a standard part using very robust, known and proven processes and technologies such as sintering, moulding, gluing, soldering. The simple and robust mechanics with non wearing parts mean that the sensor will be extremely reliable. In addition to this, the programmable ability makes the sensor easily adaptable to different foot-pedal mechanics with different pedal travel.

What is claimed is:

1. A position sensor for sensing the relative position of a first and a second component, the sensor comprising:
   a channel having a subsidiary channel section and a main channel section at an angle to one another;
   a stator connected to said first component and having a surface which includes two magnetically separate regions of magnetic material separated by said channel;
   a magnetic unit connected to said second component such that movement of said magnetic unit is in a direction parallel to said subsidiary channel, said magnetic unit having north and south pole faces arranged relative to the surface so that when said magnetic unit is in a first position relative to said stator, at least a substantial part of one pole face lies over one of the regions of magnetic material and at least a substantial part of the other pole face lies over the other region of magnetic material, thereby producing a magnetic field across said channel, and when said magnetic unit is in a second position said north and said south pole faces of said magnetic unit lie over the same region of magnetic material such that no magnetic field is produced across said channel; and
   a magnetic field sensor placed in said main channel so as to produce a signal which is dependent on the magnetic field in said channel and whereby said signal has a first value when said magnetic unit is in said first position and a second value when said magnetic unit is in said second position, the value of said signal varying in a substantially linear manner between said first value and said second value in accordance with the position of said magnetic unit between said first position and said second position such that said value of said signal represents the relative position of said first and said second component, wherein said magnetic unit is arranged so that as it moves from said first position to said second position, one pole face remains over a single region of magnetic material whereas at least part of the other pole face crosses from one region of magnetic material to the other region.

2. A position sensor as claimed in claim 1, wherein the magnetic unit comprises a permanent magnet fixedly attached to a section of magnetic material with at least one pole face of the magnetic unit being formed by the magnetic material.

3. A position sensor as claimed in claim 1, wherein the regions of magnetic material are held in their correct positions by being attached to a non magnetic base.

4. A position sensor as claimed in claim 1, wherein the stator surface and the pole faces are flat, the pole faces being able to move in a plane that is adjacent to the surface of the stator.

5. A position sensor as claimed in claim 1, wherein a layer of plastics material is placed between the stator surface and the pole faces.

6. A position sensor as claimed in claim 1, wherein the incremental area of a pole face crossing the main channel per unit displacement of the magnetic unit is constant throughout the sensed travelling distance of the magnetic unit.

7. A position sensor as claimed in claim 1, wherein the subsidiary channel section and the main channel section form a right angle where they meet.

8. A position sensor as claimed in claim 7, wherein the channel and the magnetic unit are arranged so that when the magnetic unit is in the first position, each pole face resides on a different side of the subsidiary channel.

9. A position sensor as claimed in claim 1, wherein the magnetic field sensor resides in the main channel section, orientated to measure the magnetic field component perpendicular to the length of the main channel section.

10. A position sensor as claimed in claim 1, wherein the width of the main channel is small in comparison to its depth.

11. A position sensor as claimed in claim 1, wherein the subsidiary channel is arcuate and the magnetic unit is connected to an arm pivoted at 90 degrees to the stator surface and arranged so that movement of the arm causes the magnetic unit to move over the stator surface along the subsidiary channel.

12. A position sensor as claimed in claim 11, wherein the arm is pivoted in common with a foot pedal such that angular displacement of the foot pedal causes an identical angular displacement of the magnetic unit relative to the stator.

13. A position sensor as claimed in claim 12, wherein the arm is made of magnetic material and formed integrally with the magnetic unit.

14. A position sensor as claimed in claim 1, wherein the magnetic field sensor comprises at least one Hall probe.

15. A position sensor as claimed in claim 14, wherein two ASICs are provided in the channel, each of which comprises a Hall probe integrally formed therewith, and wherein each ASIC produces a signal, the two signals being compared with one another using a redundant signal strategy.

16. A position sensor as claimed in claim 15, wherein the two ASICSs are mounted in one package.

17. A position sensor as claimed in claim 15, wherein two magnetic field sensors are placed in the channel, each producing a signal, and the two signals are compared with one another using a redundant signal strategy.

18. A position sensor as claimed in claim 15, wherein the separation between the Hall probes is 1 mm or less.

19. A position sensor as claimed in claim 1, wherein the main channel section when viewed in cross section has a recess parallel to the stator surface, the recess being formed by an area of overlap between the two regions of magnetic material.

20. A foot pedal assembly for use in a motor vehicle, the assembly comprising:

a pedal base to be fixedly mounted in a motor vehicle;

a pedal pivotably mounted on the base; and a position sensor fixably mounted with respect to said base in a position so as to be able to sense the angular position of said pedal relative to said pedal base, said position sensor including:

a stator connected to one component and having a surface which includes two magnetically separate regions of magnetic material separated by a channel;

a magnetic unit connected to the other component and having north and south pole faces arranged relative to the surface so that when the magnetic unit is in a first position relative to the stator, at least a substantial part of one pole face lies over one of the regions of magnetic material and at least a substantial part of the other pole face lies over the other region of magnetic material, thereby producing a magnetic field across the channel, and when the magnetic unit is in a second position the north and south pole faces of the magnetic unit lie over the same region of magnetic material such that no magnetic field is produced across the channel; and a magnetic field sensor placed in the channel so as to produce a signal which is dependent on the magnetic field in the channel and has a first value when the magnetic unit is in the first position and a second value when the magnetic unit is in the second position, the value of the signal varying in a substantially linear manner between the first value and the second value in accordance with the position of the magnetic unit between the first position and the second position such that the value of the signal represents the relative position of the two components.

* * * * *